UNITED STATES PATENT OFFICE.

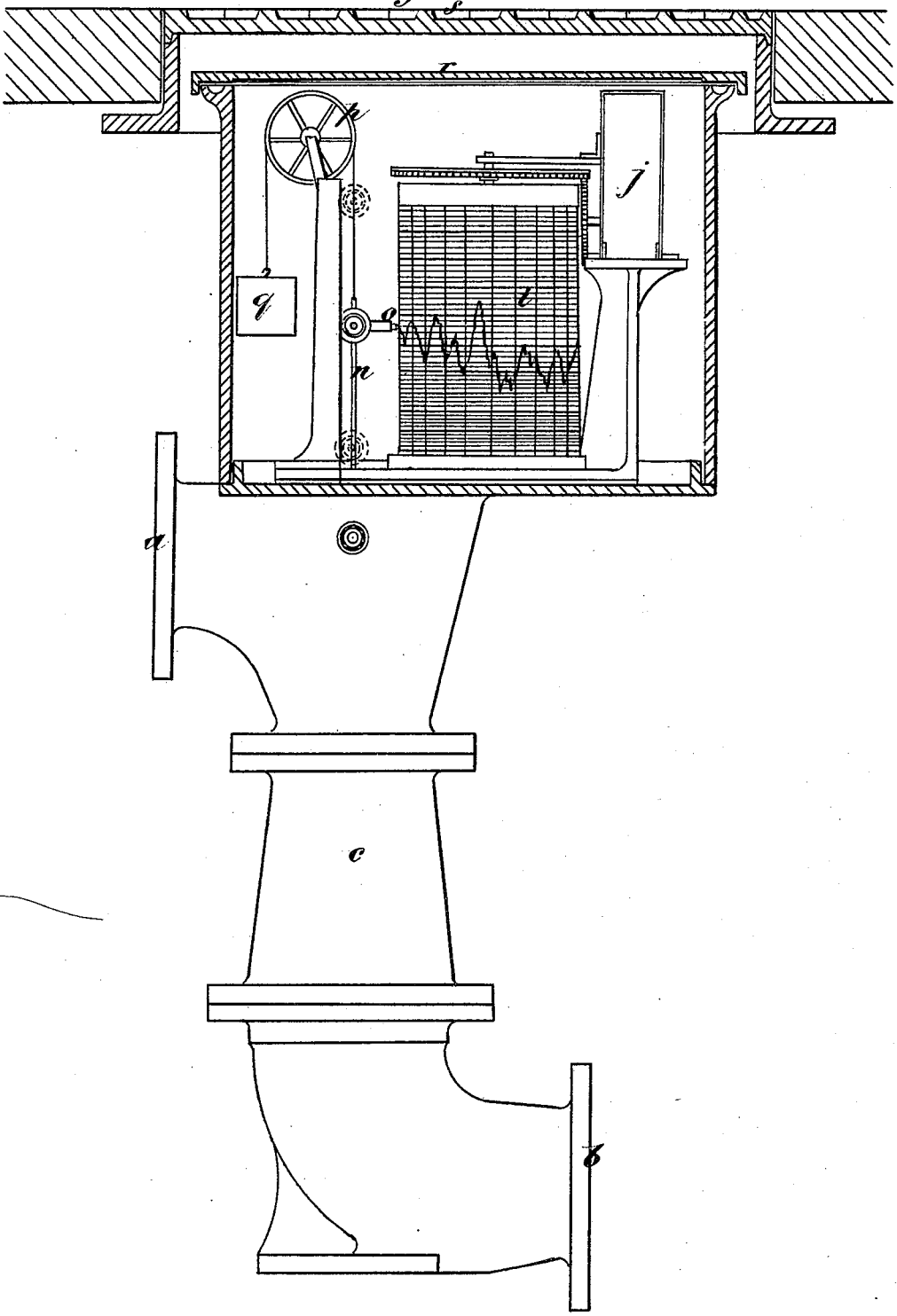

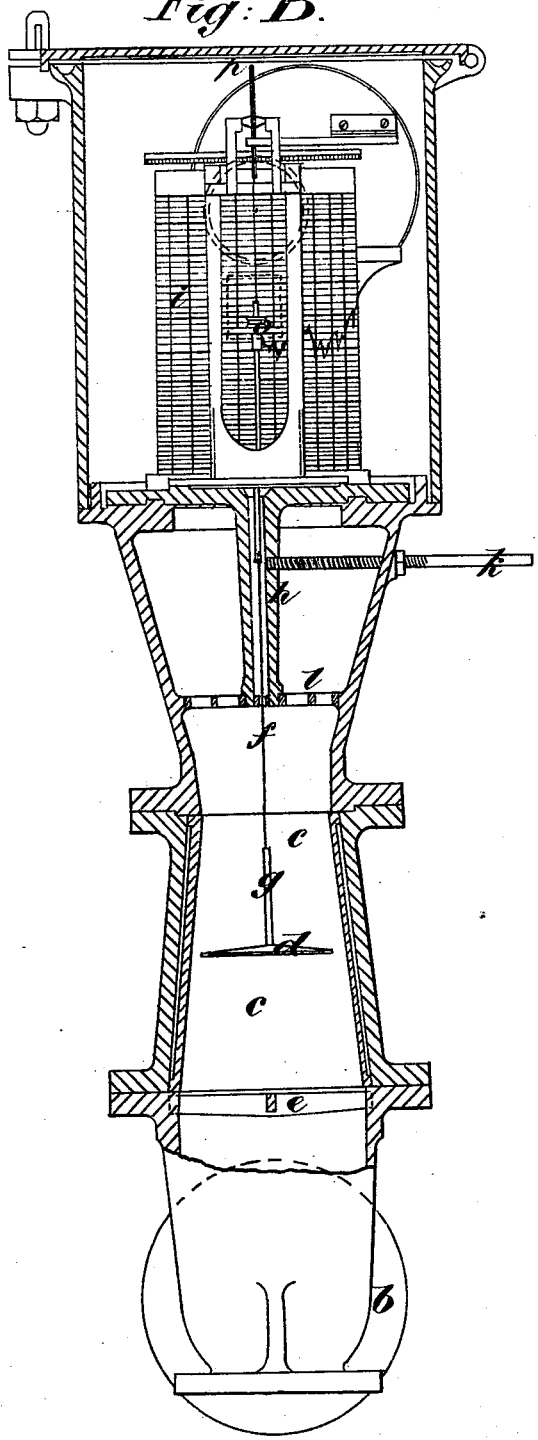

GEORGE F. DEACON, OF LIVERPOOL, ENGLAND.

IMPROVEMENT IN APPARATUS FOR INDICATING AND RECORDING THE VELOCITY OF WATER IN PIPES.

Specification forming part of Letters Patent No. 167,994, dated September 21, 1875; application filed March 2, 1874.

*To all whom it may concern:*

Be it known that I, GEORGE FREDERICK DEACON, of Liverpool, in the county of Lancaster, England, civil engineer, a subject of the Queen of Great Britain, have invented or discovered new and useful Improvements in Apparatus for Indicating the Velocity or Measuring the Flow of Water in Pipes; and I, the said GEORGE FREDERICK DEACON, do hereby declare the nature of the said invention, and in what manner the same is to be performed, to be particularly described and ascertained in and by the following statement thereof—that is to say—

The object of this invention is to provide a simple means of registering at each and every time of the day and night the velocity or quantity of water passing through any main or pipe used for the supply of water.

To effect this object, the pressure due to the velocity of the water within the main is caused to act upon a disk, ball, or other object, partly filling such main, or a tube in a loop-pipe communicating therewith, and through which the water from the main passes.

The disk, ball, or other object is supported in the water-way of the main or pipe by a wire, lever, arm, or other instrument, which by being connected with a weight or spring, tends to resist the motion of the ball, disk, or other object, in the direction of the flow of water.

In order to insure that the disk, ball, or other object shall have a particular position in the tube corresponding to each particular velocity of the water, the tube may be tapered, so that as the velocity increases and causes the ball, disk, or other object to move along and raise the weight or compress the spring, the waterway past the ball, disk, or other object also increases until the pressure on the ball, disk, or other object is so far relieved that it is exactly balanced by the weight or spring, or I may produce a similar result with a parallel tube, by connecting the ball, disk, or other object with a spring, the tension of which, or a weight, the leverage of which, or a float, the immersion of which, in a liquid weight, such as mercury, increases as the ball, disk, or other object is drawn along until, at some point, it balances the pressure due to the velocity of the water. With this last arrangement it is obviously necessary, in order to obtain motion of the ball, disk, or other object at the lower velocities of the water, that the several moving parts shall be exactly balanced when standing at the zero-point or position of no flow. Or I may combine the tapered tube with the variable weight or spring, and thus more conveniently produce particular degrees of motion for particular increments of velocity. By these several means the velocity of the water or the quantity of water passing through the main at any instant may, if the apparatus has been previously adjusted, be indicated by the position of any one of the moving parts, and may be made visible on a suitable scale, the divisions of which have been determined by trial with the same or a similar instrument, or it may be caused to register on such a scale the maximum and the minimum flow between any two observations, after the manner of a maximum and minimum thermometer. But in order to be enabled to ascertain all the various quantities of water which have passed between any two observations, I cause one of the moving parts to carry or actuate a pencil or pen, the motions of which may be registered on a cylinder or plane moved by clock-work in any of the various and well-known ways of obtaining diagrams of the rectilinear motions of a point. When a wire or rod is made use of to communicate motion from within the tube to portions of the apparatus without the tube, the difficulties arising from the friction which, more particularly under high pressure, is inseparable from the use of a stuffing-box of the ordinary construction, are obviated by dispensing with the ordinary stuffing-box, and instead of employing packing of any kind, I cause the wire or rod to pass through a hole in the metal work, or in a bush of garnet or other hard pebble, or of lignum-vitæ, which it fits as accurately as possible consistently with its freedom, and I allow the small quantity of water which oozes past the wire or rod to drain away.

The simplest and, perhaps, the most satisfactory arrangement by which I have carried out the invention, is shown in sectional side elevation at Figure A, and in sectional end elevation at Fig. B, where *a* is the inlet from the main, $b$ is the outlet to the main, $c$ is the tapered tube down which the water flows, $d$ is the disk, exactly filling the tube when in its highest position, and having in its lowest position an annular space round it about equal in area to the area of the main. $e$ is a stop or seat on which the disk rests when during a great draw of water, owing to a fire or other exceptional cause, the velocity is too great for the meter to register. $f$ is a fine wire of German silver or other metal, connected with the disk by the rigid arm or stalk $g$. $h$ is a tube, at the bottom of which is the hole through which the wire passes. $k$ is a pipe for draining off any water which oozes between the wire and the hole. $l$ is a perforated diaphragm to equalize the flow of the water. The wire $f$ connects the disk $d$ with a rigid rod, $n$, carrying a cross-head with guide-wheels and a pencil, pen, or tracer, $o$. This rigid rod and cross-head are carried by a thread or band passing over the wheel $p$ to the weight $q$, which balances the pressure on the disk due to the velocity of the water. $i$ is a vertical drum, caused to revolve by clock-work at $j$. Each of the horizontal lines upon the paper carried by the drum has the quantity of water, in gallons per hour, marked upon it, which, when the pencil stands at it, is actually passing through the tube $c$, and as the drum revolves uniformly, and is divided circumferentially into hours, the pencil registers the quantity passing at every instant of time.

This last property renders the instrument particularly useful in connection with the detection and prevention of the waste of water.

$r$ is the padlocked cover of the meter-case, and $s$ is a cover flush with the footway or carriage-way, independent of the meter-case. Both covers may be opened for the removal and replacing of the drum and the diagram it carries.

The arrangement shown on the drawing is capable of being made equally sensitive at high and low velocities, as the flow of water is impossible without some indication, while the indications at low velocities may be made still more sensitive relatively to those at high velocities by the addition of a spring, the tension of which, or a weight, the leverage of which, or a liquid weight, the displacement of which by a float, increases as the disk descends.

I claim as my invention, in connection with apparatus for indicating the velocity or measuring the flow of water in pipes—

1. The combination of a pipe through which the water flows, a disk or ball movable therein to vary the area of the water-way, a weight or spring acting in opposition to the pressure of the water on the disk or ball, and an indicator connected directly with the disk or ball, these members being constructed to operate in combination, substantially as hereinbefore set forth, whereby the velocity of the water will be shown by the position of the indicator without other mechanism, and the accuracy of its indications will not be affected by the momentum of the water.

2. The combination of a pipe through which the water flows, a disk or ball movable therein to vary the area of the water-way, a counterpoise acting in opposition to the pressure of the water on the disk or ball, an indicator moving with the disk or ball, and a traversing-chart actuated by clock-work independently of the indicator, which merely traverses its surface, these members being constructed to operate in combination, substantially as hereinbefore set forth, whereby the waste of flow of water during any given period may be registered automatically and accurately.

3. The combination, substantially as hereinbefore set forth, of the disk or ball, its supporting rod or wire, the pipe through which it passes, and a waste-pipe to carry off the water which leaks through between the rod and pipe, whereby a stuffing-box is dispensed with.

4. The combination of the pipe, the ball or disk, the annular induction water-way, and the stand-pipe through which the supporting-wire of the disk passes, these members being constructed to operate in combination, substantially as hereinbefore set forth.

GEORGE F. DEACON.

Witnesses:
THOMAS C. RYLEY,
    *Notary Public, Liverpool.*
WM. J. PEYTON.